April 11, 1939.                I. SKLENAR                2,153,727
                        INTERNAL COMBUSTION ENGINE
                        Filed June 24, 1935        2 Sheets-Sheet 2
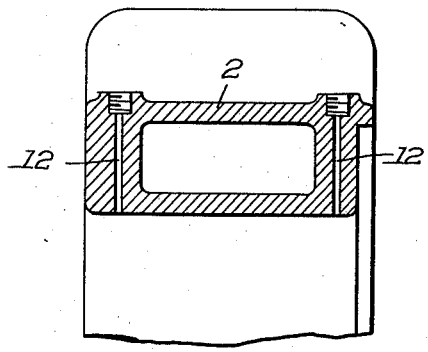
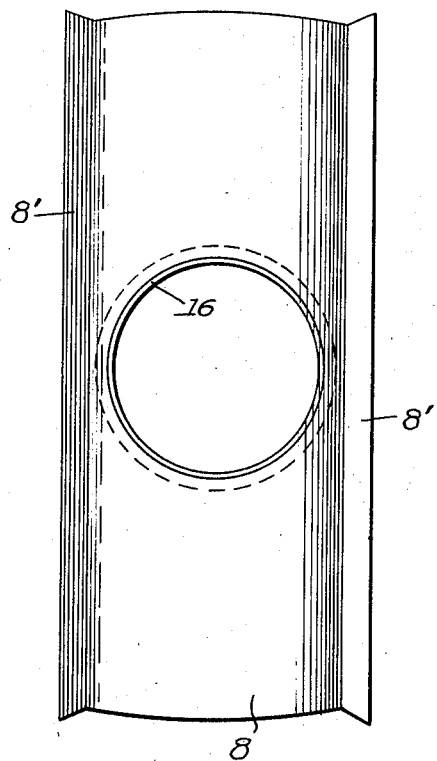
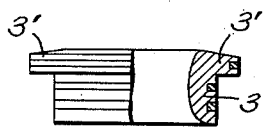
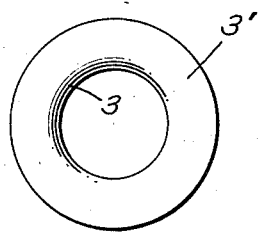
Inventor:
IGNAZ SKLENAR
By
Attorney.

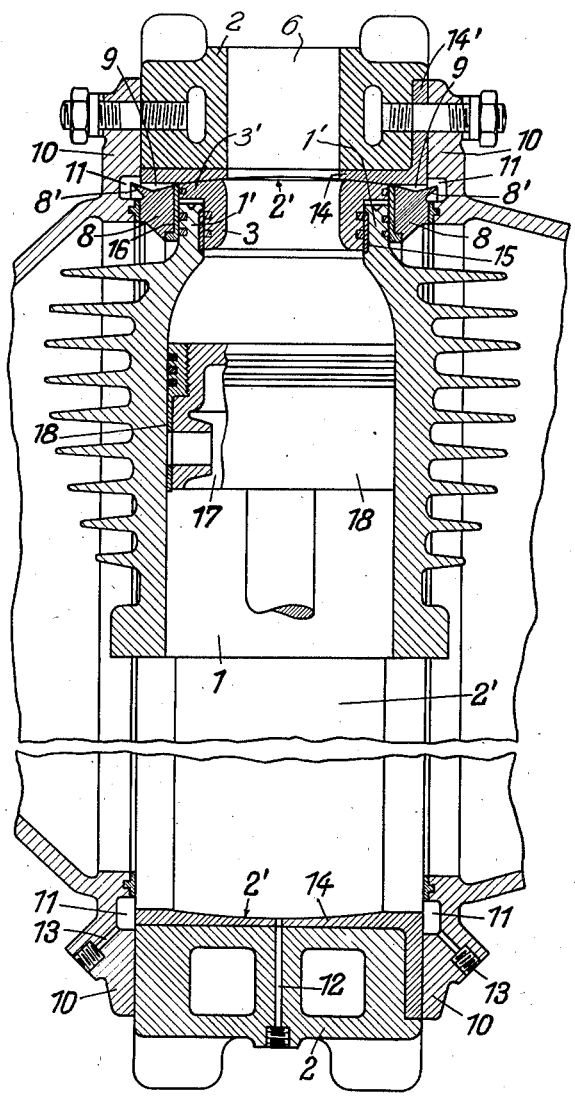

Patented Apr. 11, 1939

2,153,727

UNITED STATES PATENT OFFICE 2,153,727

INTERNAL COMBUSTION ENGINE

Ignaz Sklenar, Rosslau, Dessau, Germany, assignor to Rima A. G., Glarus, Switzerland, a corporation of Switzerland Application June 24, 1935, Serial No. 28,195
In Hungary June 28, 1934

10 Claims. (Cl. 123—190)

The present invention relates to improvements in internal combustion engines provided with rotary or stationary radially disposed cylinders and an annular slide valve of the kind in which the contacting faces of the slide valve and of the elements providing the seal between the neck of the cylinder and the slide valve are spherically curved.

The object of the invention is the provision of improved structure for effecting lubrication between the spherically curved face of the slide valve and the cooperating faces of the sealing elements. The detailed nature of the manner in which the above general object and other objects are attained may best be understood from a consideration of the ensuing portion of this specification taken in conjunction with the accompanying drawings illustrative of an engine embodying the invention.

In the drawings:

Fig. 1 is a fragmentary longitudinal section through an engine embodying the invention and taken centrally along the axis of one of the cylinders;

Fig. 2 is a longitudinal section through the annular valve shown in Fig. 1, the section being taken on a radial plane on an angle to the plane of the section of Fig. 1;

Fig. 3 is a plan view of one of the elements shown in section in Fig. 1;

Fig. 4 is a side elevation partly in section of another of the sealing elements shown in Fig. 1; and Fig. 5 is a top plan view of the element shown in Fig. 4.

Referring now particularly to Fig. 1 of the drawings, 1 designates the cylinder of the engine and 2 the hollow annular slide valve for controlling the flow of gases to and from the engine cylinders. Valve 2 is provided with a plurality of peripherally spaced ports, one of the exhaust ports 6 being shown in Fig. 1. The main valve member 2 may advantageously be provided with a lining member 14 of suitable bearing metal, the inner face of which is spherically curved as indicated at 2'.

A sealing element 3 is mounted to be axially movable and rotatable in the neck 1' of the cylinder. This sealing element is in the form of a cylindrical sleeve the outer end of which is in the form of a flange 3', the diameter of the flange advantageously being the same as the outer diameter of the cylinder neck 1'. The outer face of the sealing element 3 is spherically curved to match the spherically curved surface 2' of the valve.

For sealing the valve ports at times when the cylinder ports formed by the sealing elements 3 are not in registry with the valve ports, a series of segments or shoes 8 are provided which form a complete annular ring located inside of and bearing against the inner face of the valve member. One of these shoes is shown in plan view in Fig. 3. The outer faces of the shoes are spherically curved to match the curved valve face 2', and each of the shoes is provided with a centrally located circular aperture 16 in which the flange portion of the cooperating sealing element 3 has a sliding fit.

In order to reduce the frictional contact area between each shoe and the valve, the outer surfaces of the shoes and the inner surface of the valve are advantageously constructed to provide wedge shaped gaps extending peripherally at the sides of these elements, leaving between these channels a frictionally contacting area between the valve and the shoes which is no wider than the diameter of the flange portions 3' of the elements 3.

These wedge-shaped gaps 9 at the same time, however, also form oil channels, that is, wedge-shaped channels which are open toward the outside and introduce the lubricating oil between the sealing faces of the slide valve and the shoes. The lubricating oil is supplied to these channels 9 by the peripheral oil grooves 11, which are provided opposite thereto in the side portions 10 of the motor casing adjacent to the slide valve 2, and collect the superfluous oil in their bottom portion, from where it is lifted by the rotating shoes and conveyed to the channels 9, which in turn conduct it at the top between the sealing faces. For this purpose the shoes 8 are furnished on each of the two longitudinal sides with a rib 8', these ribs being inclined in opposition to the curved outer face and projecting into the oil grooves 11, lifting the oil adhering thereto out of the grooves 11 and conveying it to the channel 9. To facilitate the lifting of the oil the grooves 11 are continuously increased in width in a radial direction from the top towards the bottom. The actual supply of oil to the sealing faces takes place by way of radial oil channels 12, (Fig. 2) which are provided in the slide valve 2 preferably in the horizontal middle plane and also at the lowest point of the slide valve. The oil feed openings in the horizontal middle plane are advantageously at the sides of the valve as shown in Fig. 2 and the openings at the lowest point in the central plane of the valve as shown in Fig. 1.

For discharging excessive oil from the grooves 11 or for emptying these grooves, there are provided at the lowest point thereof passages 13 opening outwardly.

It will be evident that the construction just described provides for a minimum frictional contact area between the shoes and the valve and also affords, through the wedge-shaped channels 9, a ready and improved means for introduction of lubricant between the relatively sliding surfaces, and further affords improved means for distribution of the lubricant and control of excess quantities thereof.

Obviously, changes in the specific design of the apparatus may be made without departing from the scope of the invention as defined in the appended claims.

What I claim as new and desire to secure by Letters Patent is:

1. In an internal combustion engine with a plurality of cylinders, an annular ported slide valve common to all of said cylinders and having a spherically curved bearing surface, a separate sealing element between each of said cylinders and said valve, said sealing elements being movable relative to their respective cylinders, shoes for sealing the ports of said valve when the ports are out of registry with a cylinder, said sealing elements and said shoes having spherically curved bearing surfaces cooperating with the curved bearing surface of said valve, and peripherally extending channels for oil formed between said valve and said shoes by termination of the bearing contact between the valve and the shoes short of the lateral extremities thereof.

2. In an internal combustion engine with a plurality of cylinders having neck portions, an annular ported slide valve common to all of said cylinders, a separate sealing element for providing a seal between the neck portion of each of said cylinders and said valve, said sealing elements being rotatably and axially movable with respect to said neck portions, shoes around said neck portions for sealing the ports of said valve when the ports are out of registry with a cylinder, peripherally extending oil channels formed between said valve and said shoes by termination of the bearing contact between the valve and the shoes short of their lateral extremities and a flange-like enlargement on each of said sealing elements providing a seal between the neck portions of the cylinders and the shoes.

3. In an internal combustion engine with a plurality of cylinders having neck portions, an annular ported slide valve common to all of said cylinders and having a spherically curved bearing surface, a separate sealing element for providing a seal between the neck portion of each of said cylinders and said valve, said sealing elements being rotatably and axially movable with respect to said neck portions, shoes for sealing the ports of said valve when the ports are out of registry with a cylinder, spherically curved bearing surfaces on said shoes and said sealing elements bearing respectively on the spherically curved bearing surface of said valve, and peripherally extending channels for oil having a wedge shaped cross-section formed between said valve and said shoes to either side of the spherically curved bearing surfaces of the shoes by termination of the bearing contact between the valve and the shoes short of the lateral extremities thereof.

4. In an internal combustion engine with a plurality of cylinders, an annular ported slide valve common to all of said cylinders and having a spherically curved bearing surface, sealing elements rotatably and axially movable with respect to the cylinders and providing a seal between the cylinders and said valve, and shoes for sealing the ports of the valve when the ports are out of registry with a cylinder, said sealing elements and said shoes having spherically curved bearing surfaces cooperating with the spherically curved bearing surface of said valve, the spherically curved surfaces of said valve and of said shoes merging into laterally diverging annular faces coaxial with the annular slide valve, said diverging faces forming between them wedge shaped channels for oil.

5. In an internal combustion engine with a plurality of cylinders, an annular ported slide valve common to all of said cylinders and having a spherically curved bearing surface, sealing elements rotatably and axially movable with respect to the cylinders and providing a seal between the cylinders and said valve, shoes for sealing the ports of the valve when the ports are out of registry with a cylinder, said sealing elements and said shoes having spherically curved bearing surfaces cooperating with the spherically curved bearing surface of said valve, an engine casing, peripherally extending oil channels formed between said valve and said shoes by termination of the bearing contact between the valve and the shoes short of their lateral extremities and peripherally extending oil grooves in said casing opposite said channels.

6. In an internal combustion engine with a plurality of cylinders, an annular ported slide valve common to all of said cylinders and having a spherically curved bearing surface, sealing elements rotatably and axially movable with respect to the cylinders and providing a seal between the cylinders and said valve, shoes for sealing the ports of the valve when the ports are out of registry with a cylinder, said sealing elements and said shoes having spherically curved bearing surfaces cooperating with the spherically curved bearing surface of said valve, an engine casing, peripherally extending oil channels formed between said valve and said shoes by termination of the bearing contact between the valve and the shoes short of their lateral extremities and peripherally extending oil grooves in said casing opposite said channels, the width of said grooves increasing progressively along the length thereof from the highest to the lowest point of the grooves.

7. In an internal combustion engine with a plurality of cylinders, an annular ported slide valve common to all of said cylinders and having a spherically curved bearing surface, sealing elements rotatably and axially movable with respect to the cylinders and providing a seal between the cylinders and said valve, shoes for sealing the ports of the valve when the ports are out of registry with a cylinder, said sealing elements and said shoes having spherically curved bearing surfaces cooperating with the spherically curved bearing surface of said valve, an engine casing, peripherally extending oil channels formed between said valve and said shoes by termination of the bearing contact between the valve and the shoes short of their lateral extremities, peripherally extending oil grooves in said casing opposite said channels, and passages extending from the lowest point of said grooves to the exterior of the casing for discharging accumulated oil.

8. In an internal combustion engine with a plurality of cylinders, an annular ported slide valve common to all of said cylinders and having a spherically curved bearing surface, sealing elements rotatably and axially movable with respect to the cylinders and providing a seal between the cylinders and said valve, shoes for sealing the ports of the valve when the ports are out of registry with a cylinder, said sealing elements and said shoes having spherically curved bearing surfaces cooperating with the spherically curved bearing surface of said valve, an engine casing, peripherally extending oil channels formed between said valve and said shoes by termination of the bearing contact between the valve and the shoes short of their lateral extremities, peripherally extending oil grooves in said casing opposite said channels, and a rib on each of the lateral sides of the shoes extending into said grooves for conveying oil from the grooves into said channels.

9. In an internal combustion engine with a plurality of cylinders, an annular ported slide valve common to all of said cylinders and having a spherically curved bearing surface, sealing elements rotatably and axially movable with respect to the cylinders and providing a seal between the cylinders and said valve, shoes for sealing the ports of the valve when the ports are out of registry with a cylinder, said sealing elements and said shoes having spherically curved bearing surfaces cooperating with the spherically curved bearing surface of said valve, an engine casing, peripherally extending oil channels formed between said valve and said shoes by termination of the bearing contact between the valve and the shoes short of their lateral extremities, peripherally extending oil grooves in said casing opposite said channels, and radial oil supply passages in said valve.

10. In an internal combustion engine with a plurality of cylinders, an annular ported slide valve common to all of said cylinders and having a spherically curved bearing surface, sealing elements rotatably and axially movable with respect to the cylinders and providing a seal between the cylinders and said valve, shoes for sealing the ports of the valve when the ports are out of registry with a cylinder, said sealing elements and said shoes having spherically curved bearing surfaces cooperating with the spherically curved bearing surface of said valve, an engine casing, peripherally extending oil channels formed between said valve and said shoes by termination of the bearing contact between the valve and the shoes short of their lateral extremities, peripherally extending oil grooves in said casing opposite said channels, and radial oil supply passages in said valve, some of said passages being located in the central radial plane of the valve and other of said passages being located in the vicinity of said channels.

IGNAZ SKLENAR.